United States Patent [19]
Yokoyama et al.

[11] Patent Number: 5,850,468
[45] Date of Patent: Dec. 15, 1998

[54] FLAW DETECTION APPARATUS

[75] Inventors: Haruhiko Yokoyama; Akira Kobayashi, both of Osaka, Japan

[73] Assignee: Matsushita Electric Industrial Co., Ltd., Osaka-fu, Japan

[21] Appl. No.: 8,211

[22] Filed: Jan. 16, 1998

Related U.S. Application Data

[63] Continuation of Ser. No. 420,029, Apr. 11, 1995, abandoned.

[51] Int. Cl.[6] .................................................. G06K 9/00
[52] U.S. Cl. .......................... 382/149; 348/128; 356/237; 382/108; 382/288
[58] Field of Search .................................. 382/108, 141, 382/225, 288; 348/128; 356/237

[56] References Cited

U.S. PATENT DOCUMENTS

| | | | |
|---|---|---|---|
| 4,876,732 | 10/1989 | Miyagawa et al. | 382/288 |
| 4,949,282 | 8/1990 | Muraoka | 382/288 |
| 5,046,115 | 9/1991 | Mariyuma et al. | 382/108 |
| 5,073,962 | 12/1991 | Califano | 382/205 |
| 5,091,969 | 2/1992 | Kuwashima | 382/288 |
| 5,179,419 | 1/1993 | Palmquist et al. | 356/73.1 |
| 5,206,917 | 4/1993 | Ueno et al. | 382/288 |
| 5,220,619 | 6/1993 | Keokoek | 382/153 |
| 5,233,670 | 8/1993 | Dufour et al. | 382/197 |
| 5,243,665 | 9/1993 | Maney et al. | 382/152 |
| 5,309,486 | 5/1994 | Lichauer | 376/248 |
| 5,335,298 | 8/1994 | Hevenor et al. | 382/199 |
| 5,335,547 | 8/1994 | Nakajima et al. | 73/622 |
| 5,485,532 | 1/1996 | Isihara | 382/205 |
| 5,544,256 | 8/1996 | Brecher et al. | 382/149 |

OTHER PUBLICATIONS

Wong et al. "Scene Matching with Invariant Moments", *Computer Graphics and Image Processing*, 8,16 24 (1978) pp. 16–24.

Sobey et al. "Detection and Sizing Visual Features in Wood Using Tonal Measures and a Classification Algorithm", *Pattern Recognition*, vol. 22, No. 4, 1989, pp. 367–380.

*Primary Examiner*—Amelia Au
*Assistant Examiner*—Jayanti K. Patel
*Attorney, Agent, or Firm*—Ratner & Prestia

[57] ABSTRACT

A flaw detection apparatus detects a flaw formed on an object's surface based on a digital image data indicative of said object's surface as a group of plural pixels utilizing the image processing technique. An image processor is provided for detecting a direction in which each of group extends to combine a plurality of groups extending in substantially the same direction. The image processor further produces a flaw signal indicating sizes of thus combined groups.

5 Claims, 12 Drawing Sheets

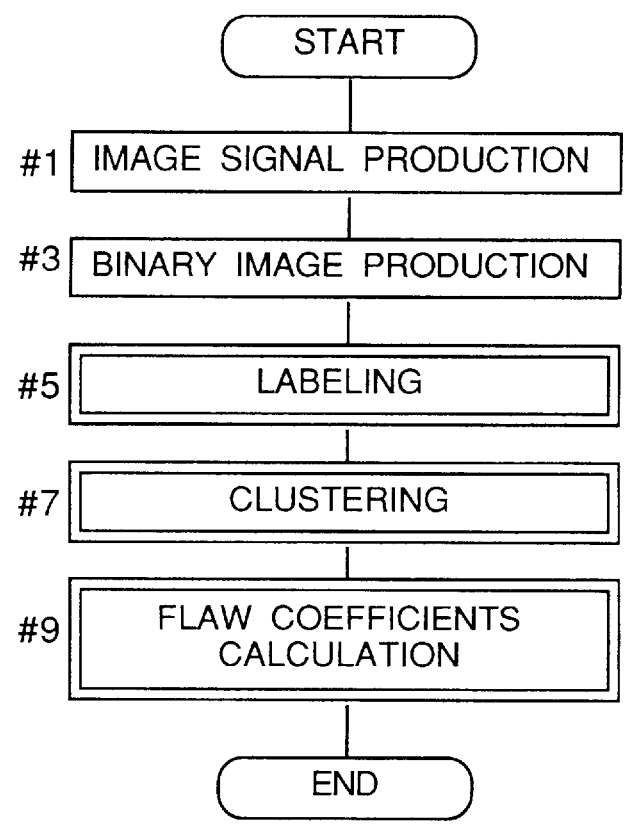

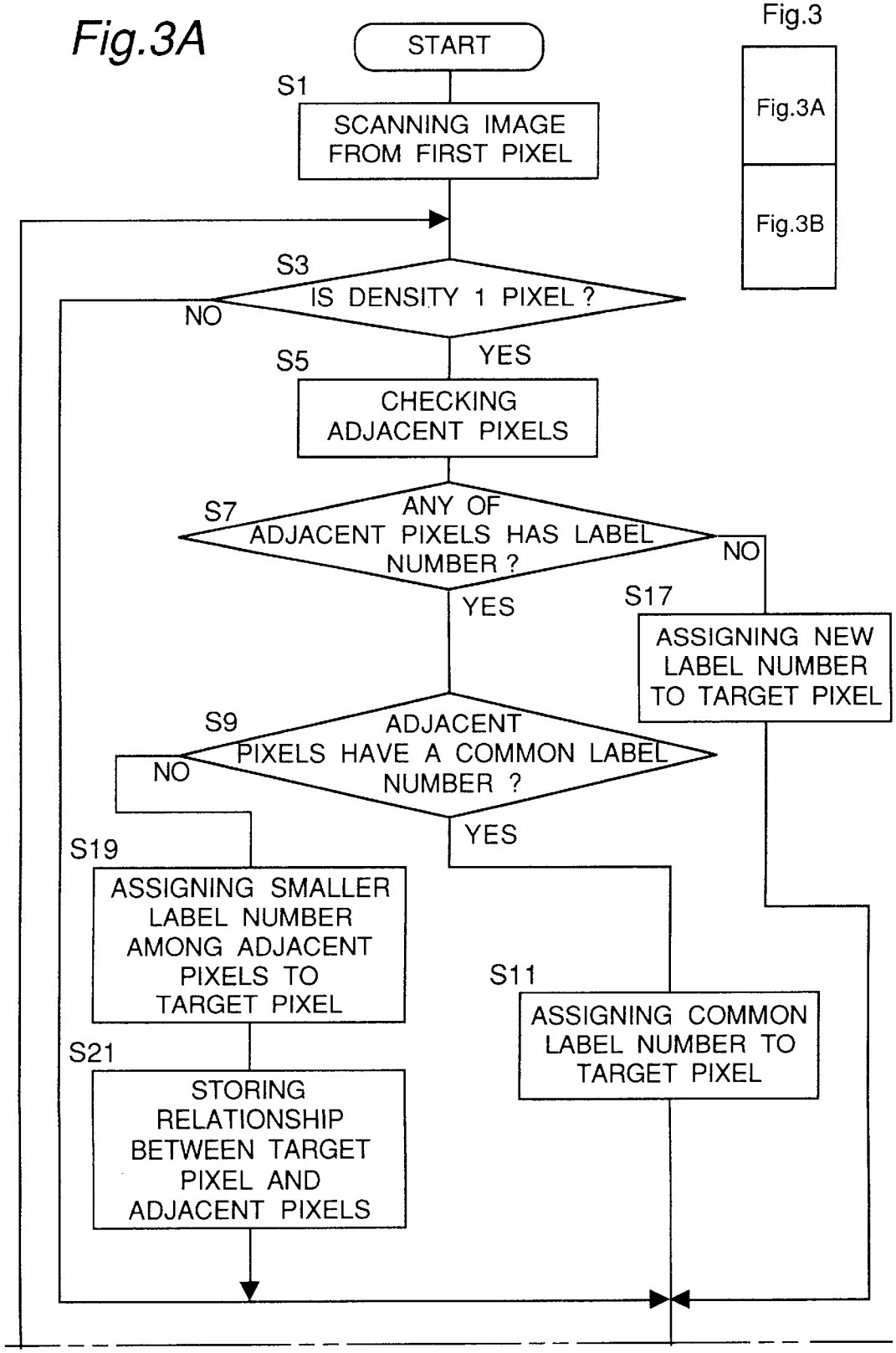

FLAW DETECTION APPARATUS

This applicaiton is a continuation of U.S. patent application Ser. No. 08/420,029 filed Apr. 11, 1995, now abandoned.

BACKGROUND OF THE INVENTION

1. Field of the Invention

The present invention relates to a flaw detection apparatus for detecting flaws in mechanical components and other items and, more particularly, to a flaw detection apparatus utilizing the image processing techniques.

2. Description of the Prior Art

For the detection of flaws on an object, various kinds of flaw detection apparatuses utilizing the image processing technique are proposed. In FIG. 6A, a cylinder 1 having flaws on the surface thereof is shown. In FIG. 6B, a binary image of the surface area of the cylinder 1 in FIG. 6A, where plural flaws are available, is shown on an enlarged scale. When there is a flaw on a smooth surface, the area of the flaw will reflect irregularly. As a result, dark-field illumination, whereby light is emitted to the surface at an angle such that direct reflections do not enter the imaging apparatus, can be used in flaw detection by image processing because only reflections from the irregularly reflecting flaw area will enter the imaging apparatus, and an image of the flaw can thus be obtained. Thus, the binary image representing, for example five in this case, areas R1, R2, R3, R4, and R5 each corresponding to flaws separated to each other is obtained in a such manner, as shown in FIG. 6B.

To obtain this binary image, the input from the television camera is stored to an image storing circuit using an image input device. The stored image is then digitized. This means that pixels with a pixel density exceeding a predetermined threshold value are assigned a value of 1, and pixels with a pixel density below this threshold value are assigned a value of 0. As a result, when the image in FIG. 6A is digitized, the pixels in the area of the reflecting flaw are given a value of 1, and all other pixels are given a value of 0.

The next step is labelling. In labelling, the image is divided into areas of pixels each with a density value of 1 and areas of pixels each with a density value of 0. Linked areas are further formed in the density 1 pixel areas from vertically, horizontally, and diagonally adjacent pixels each with a density of 1, these linked areas are sequentially numbered throughout the image, and each pixel in linked areas is assigned the sequential number of the linked area to which it belongs.

After all pixels are labelled, the plural label numbers assigned to pixels in connected areas are unified to a single common label number in order to unify the pixel label numbers in connected label areas.

After this labelling process is completed, the area, or more specifically the number of pixels, of each uniquely numbered linked area (hereafter "label areas") is computed. While there may be reflections (density 1 pixel areas) other than flaws caused by irregular reflections from dust or other foreign matter or slight irregular reflection from smooth areas, these areas will be limited to a very small area. As a result, label areas smaller than a predetermined area threshold are eliminated to prevent false recognition of flaws, and the label areas exceeding a predetermined area threshold are extracted as "flaws".

The problem with this conventional method is described below. Specifically, flaws caused by an impact to the smooth surface area of the inspected item typically occur as a series of plural binary images as shown in FIG. 6A. When the flaw is a fine line of multiple imperfections and the label area of each individual imperfection is evaluated, the small area of each individual flaw makes it difficult to determine whether there is actually a flaw or simply dust or other foreign matter on the surface.

SUMMARY OF THE INVENTION

The present invention has been developed with a view to substantially solving the above described disadvantages and has for its essential object to provide an improved flaw detection apparatus.

In order to achieve the aforementioned objective, a flaw detection apparatus for detecting a flaw formed on an object's surface based on a first digital image data indicative of said object's surface as a first group of plural pixels adjacent to each other, said apparatus comprises a first direction detection means for detecting a direction in which each said first group extends; a first cluster means for combining a plurality of said first groups extending in directions different from each other less than a first predetermined degree; and a first flaw signal producing means for producing a first flaw signal indicating sizes of said combined groups.

BRIEF DESCRIPTION OF THE DRAWINGS

These and other objects and features of the present invention will become clear from the following description taken in conjunction with the preferred embodiment thereof with reference to the accompanying drawings throughout which like parts are designated by like reference numerals, and in which:

FIG. 2 is a flow chart showing an operation of the flaw detection apparatus of FIG. 1, FIGS. 3A and 3B, taken together as shown in FIG. 3, show a flow chart for the labeling block in FIG. 2.

DETAILED DESCRIPTION OF THE PREFERRED EMBODIMENT

Figure 1:
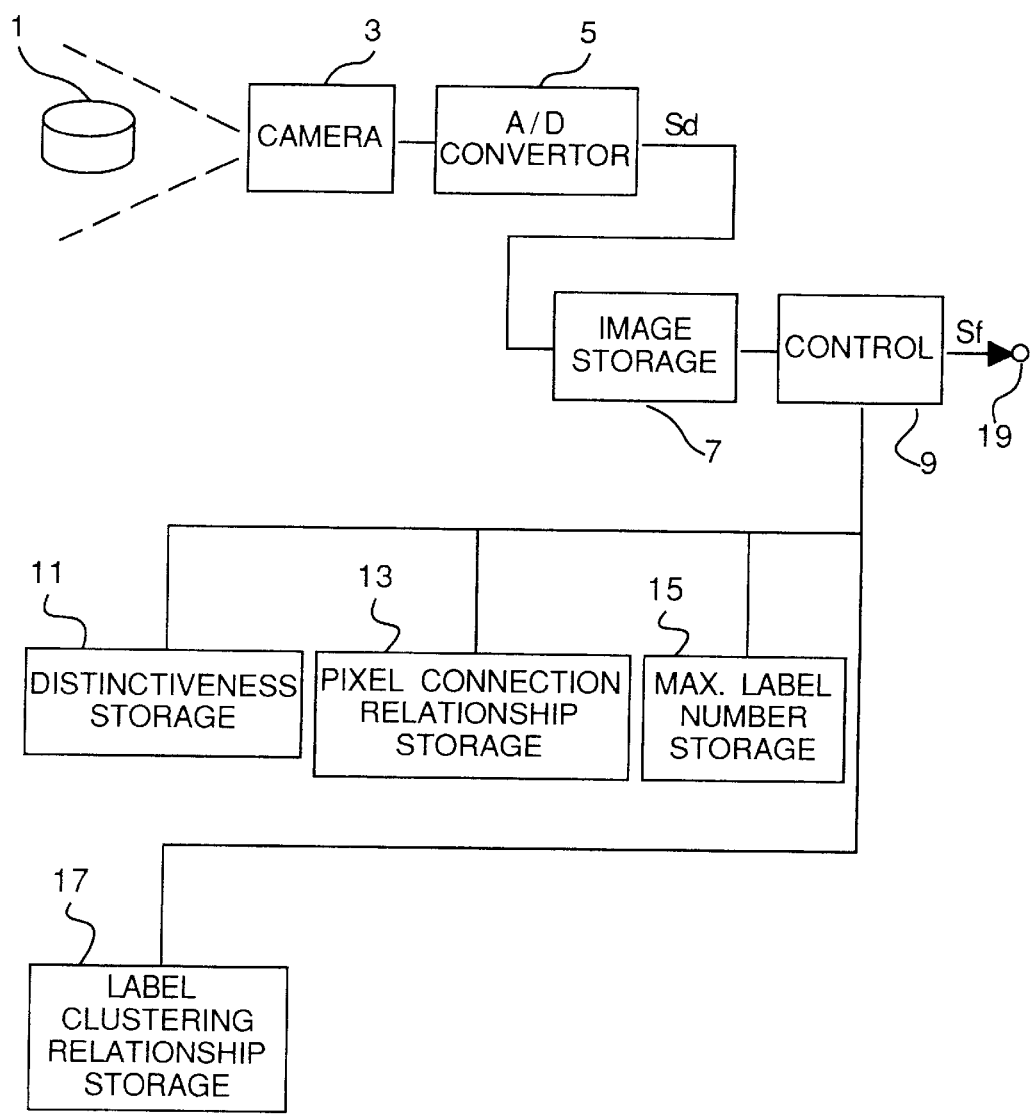
FIG. 1 is a block diagram showing a flaw detection apparatus according to the present invention.

Referring to FIG. 1, a block diagram of a flaw detection apparatus according to a preferred embodiment of the present invention is shown. The flaw detection apparatus includes a camera 3, an A/D converter 5, an image storage 7, and an image processor 9. The camera 3 is provided for taking an image of an inspecting object 1 to produce an analog image signal based on thus taken image. The A/D converter 5 converts the analog image signal coming from the camera 3 to a digital image signal Sd. The image storage 7 is comprised of a frame memory, and stores the digital image signal Sd indicative of image information of the object 1. The image processor 9 includes a distinctiveness storage 11, a pixel connection relationship storage 13, a maximum label number storage 15, and a label clustering relationship storage 17. The image processor 9 processes the digital image signal Sd from the image storage 7 to produce a flaw coefficient signal Sf representing the degree of flaw. During the production of the flaw coefficient signal Sf, various signals are produced and stored in each of storage 11, 13, 15, and 17, which will be described later with reference to FIGS. 3, 4, and 5. The flaw coefficient signal Sf is transferred to the externals through an output 19.

Referring to FIGS. 2, 3, 4, and 5, the flaw charts for describing the operation of the flaw detection apparatus of FIG. 1 are shown. In FIG. 2, the blocks marked by a double outline represent sub-routine blocks.

Figure 6A:
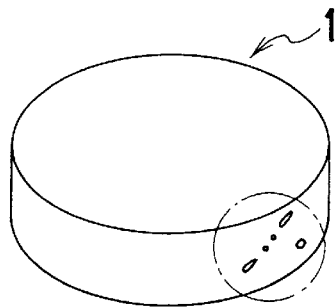
FIG. 6A is a perspective view showing a cylinder used as the inspection target by way of example.

In the first block #1 of FIG. 2, "IMAGE SIGNAL PRODUCTION", the video camera 3 takes the image of the object 1, which may be a cylinder as shown in FIG. 6A for example, and then produces the analog image signal based on the image thus taken.

Figure 6B:
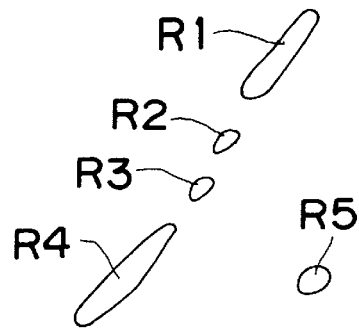
FIG. 6B is a graph showing, on an enlarged scale, a portion of FIG. 6A which is enclosed by the circle.

In the next sub-routine block #3, "BINARY IMAGE PRODUCTION", the A/D converter 5 converts the analog image signals indicative of the inspected object's surface to the digital image signals Sd. This means that pixels with a pixel density exceeding a predetermined threshold value are assigned a value of 1, and pixels with a pixel density below this threshold value are assigned a value of 0. As a result, when the image signal is digitized, the pixels in the area of the reflecting flaw are given a value of 1, and all other pixels are given a value of 0. This digitized image signal is then stored in the image storage 7. As a result, a binary image of the inspected area of the cylinder 1 including flaws is obtained, as shown in FIG. 6B.

In the next sub-routine block #5, "LABELLING", the image storage 7 stores the digital image signal Sd therein. The image processor 9 assigns label numbers to pixels with a value of 1 so that each uniquely linked area has a common label number. The labeling operation will be further described later with reference to FIGS. 3 and 7.

In the next sub block #7, "CLUSTERING", labelled areas oriented in the same direction on substantially the same line are assumed to have been caused by a common factor, e.g., a single impact, and are therefore evaluated as a single cluster the image processor 9. The clustering operation will be specifically described later with reference to FIGS. 4, 9A, 9B, 9C, 9D, 9E, and 9F.

In the next sub block #9, "FLAW COEFFICIENTS CALCULATION", the image processor 9 calculates the flaw coefficients representing the magnitude of detected flaw based on the clustered labelled areas, and transfers the flaw coefficient signal Sf through the output 11 for further operation. The operation will be specifically described later with reference to FIGS. 5, 8A, 8B, 10, and 11.

Figure 3B:
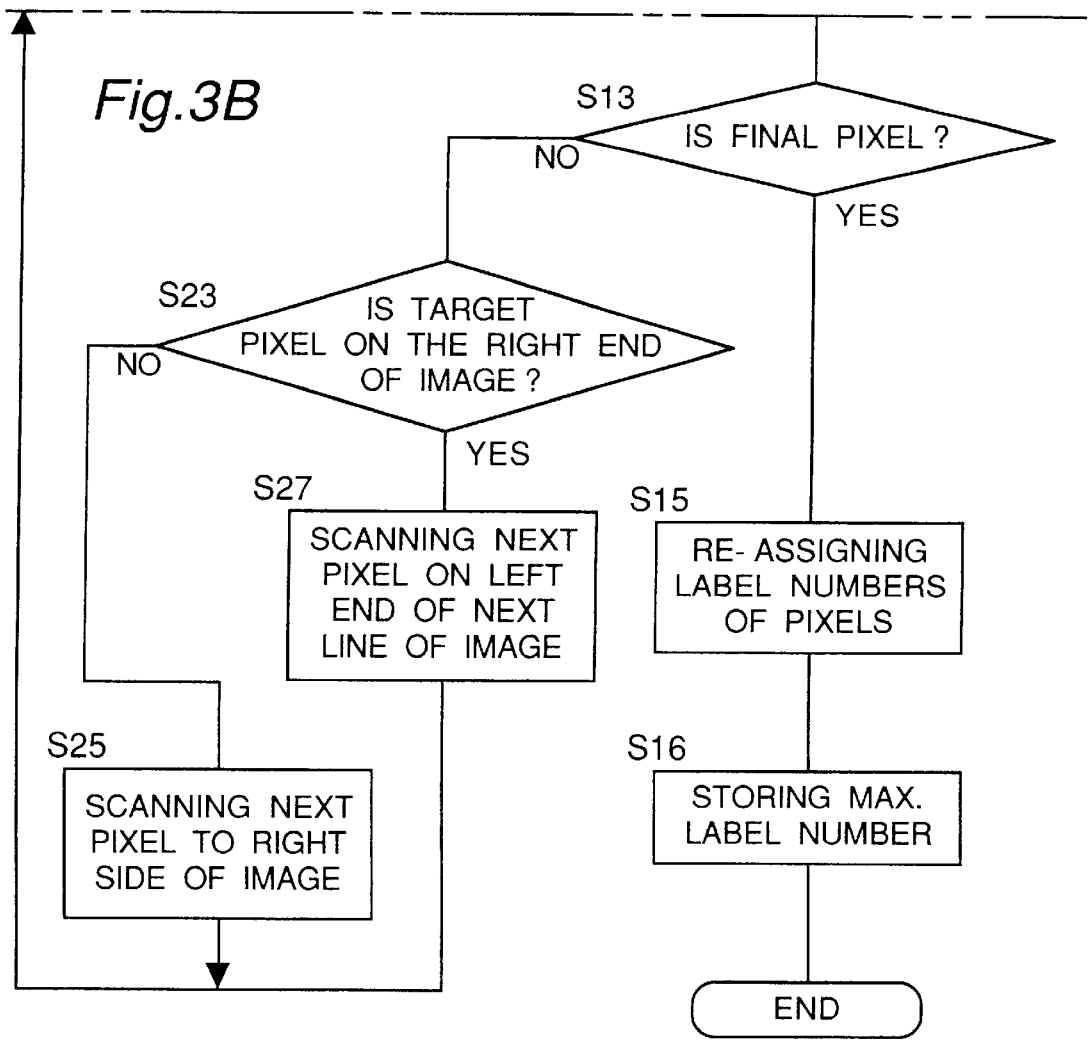
Figure 7:
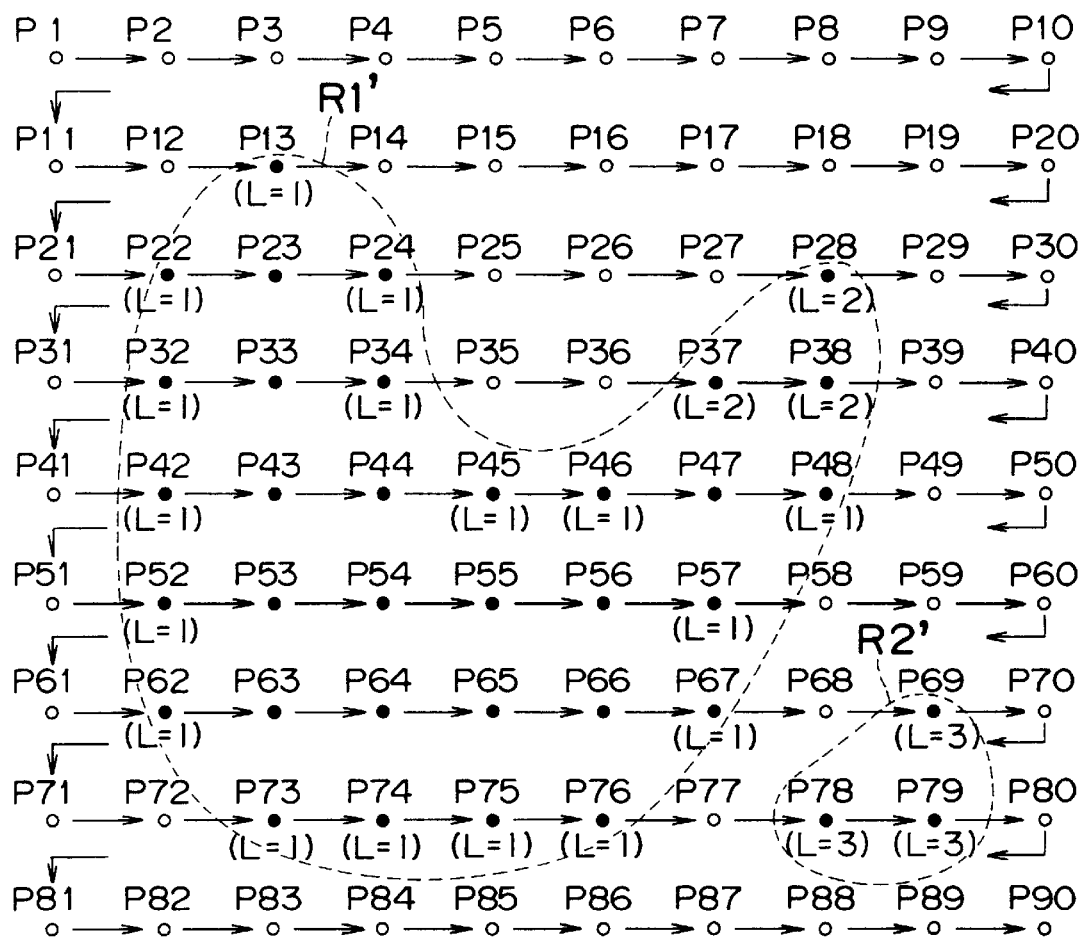
FIG. 7 is an illustration of assistance in explaining the labelling operation according to the present invention.

Before specifically describing the labeling operation in this embodiment with reference to FIGS. 3 and 7, the concept of labeling operation according to the present invention is briefly described for the sake of better understanding. In labelling, the image may be divided into areas of pixels each with a density value of 0. These pixels are raster scanned from top to bottom, left to right. Specifically speaking, each of pixels located in the top line is sequentially scanned from the first one (the left side) to the last one (the right side). Then, pixels in the next line below the top line are scanned in a manner similar to that in the top line.

Every time when a pixel with a density value of 1 (hereafter referred to as "a density 1 pixel") is scanned, this pixel is set as the target pixel and is assigned a label number L. The label number is an integer. Basically, a different label number L increased in order is successively assigned to each target pixel.

The label number L=1 is assigned to the first target pixel and the raster scanning continues. When the next, or second, target pixel is set, adjacent eight pixels surrounding the target pixel, four pixels located the left, above left diagonally, above, and the above right diagonally with respect to the target pixel are checked whether a label number L is assigned thereto. It is to be noted that these four adjacent pixels are already scanned before the target pixel is scanned. When these four adjacent pixels have a common label number L, including the case that only one of adjacent pixels has the label number L, that label number L is assigned to the target pixel.

When two or more label numbers L=n, m, ... (n, m ... are integers) are assigned to these adjacent pixels, one of the label numbers which is smaller than the others is assigned and information indicating that label numbers L=n, L=m ... are connected is stored for the later operation wherein the label numbers are organized and unified. When four adjacent pixels have no label number, the next label number with respect to that of the previous target pixel is assigned.

The raster scanning is thus applied to all pixels in the binary image stored in the image storage 7. Linked areas are further formed in the density 1 pixel areas from vertically, horizontally, and diagonally adjacent to each other, these linked areas are sequentially numbered throughout the image. As a result, each pixel in each linked area is assigned the same sequential number which is given to the region to which it belongs.

Referring to FIG. 7, the binary image stored in the image storage 7 is shown. In FIG. 7, the image is expressed by pixels P1 to P90, for example, arranged in a rectangular matrix. The areas corresponding two flaw regions R1' and R2' on the inspected surface of cylinder 1 are shown by dot lines. Each of small circles indicates a pixel. The small circles indicating the density 1 pixels are painted in block.

The raster scanning is starting from the first pixel P1. Since the pixels P1 to P12 are not the density 1 pixels, these pixels are not the target pixels and no label number L is assigned thereto. However, the next pixel P13 is the first density 1 pixel. Therefore the pixel P13 is set as the first target pixel and is assigned the label number 1 (L=1), as shown in FIG. 7.

Then the raster scanning is applied to the next pixel P14. The pixels P14 to P21 are not the density 1 pixels in this example, and no label number L is assigned thereto. Hereinafter the description of the operation for non density 1 pixels are omitted for the sake of brevity, because non density 1 pixels are only scanned as a result.

The next pixel P22 which is the density 1 pixel is set as the target pixel. Then, the label number of four pixels P21, P11, P12, and P13 adjacent the target pixel P22 are checked. In this example of FIG. 7, since only the pixels P13 has the label number L=1, 1 is assigned to the target pixel P22 (L=1).

With respect to pixels P23 and P24, the common label number L=1 of the adjacent pixels is assigned.

After raster scanning of pixels P25 to P27, the next density 1 pixel P28 is set as the target pixel. Since the pixels P27, P17, P18, and P19 adjacent the pixel P23 has no label number, a new label number of 2 (L=2) which is different from that of pixels P13, P22, P23, and P24 is assigned to the pixel P23.

After scanning of pixels P29, P30, and P31, the pixel P32, P33, and P34 are set as the target and assigned the common label number of 1 (L=1) of the adjacent pixels.

After scanning of pixels P35 and P36, the next density 1 pixel P37 is set as the target pixel. Since the pixel P28 which is one of pixels adjacent to the target pixel P37 having the label number L=2, 2 is assigned to the pixel P37 (L=2). Similarly, the pixel P38 is assigned the common label number of 2 (L=2) of the adjacent pixels thereof.

After scanning of pixels P39, P40, and P41, the pixels P42, P43, P44, and P45 are assigned the label number of 1 (L=1) , because 1 is the common label number of the adjacent pixels thereof. However, with respect to the pixel P46, the adjacent pixels P37 and pixel P45 have different label numbers of 2 and 1, respectively. In this case, the label number of 1 smaller than-the other is selected for the pixel P46 (L=1), as described in the above. Similarly, the pixels P46, P47, and P48 are assigned the label number L=1.

After assigning the label number of 1 to the pixels P52 to P57, P62 to P67, the next target pixel P69 is set. Since the adjacent pixels P68, P58, P59, and 60 of the target pixel P69 has no label number, a new label number 3 is assigned to the pixel P69 (L=3).

In a manner as described above, the label numbers of 1 is further assigned to pixels P73 to P76, and 3 is assigned to pixels P78 and P79. The pixels having the label numbers of 1 and 2 (L=1 and L=2) are linked as a region corresponding to the flaw R1', while the information that pixels having different label numbers 1 and 2 are connected to one linked region is stored. The pixels having the label number L=3 are linked as another region corresponding to flaw R2'.

After all pixels have been labelled as above, the different label numbers of 1 and 2 assigned to pixels within the connected regions R1' are renumbered to unify to a single common label number. As a result of such renumbering, the regions R1' and R'2 are united to the label numbers L=1 and L=3, respectively. As a result, a gap in the number sequence between the region R1' (L=1) and region R2' (L=3) is generated. If required, the label numbers can be renumbered so that there are no gaps in the number sequence between the regions, such that regions R1' and F2' are newly assigned the label numbers 1 and 2, respectively.

Referring to FIG. 3, the operation of sub routine block #5, "LABELLING", in FIG. 2 is shown.

At step S1, the first pixel on the image matrix is raster scanned, and then the procedure advances to step S3 where it is judged whether the scanned pixel is a density 1 pixel or not.

At step S3, if it is judged as "YES", this density 1 pixel is set as a target pixel. If it is judged as "NO", the procedure advances to step S13.

At step S5, of eight pixels adjacent to the target pixels, the four pixels which are located to the left, above left diagonally, above, and above right diagonally to the target pixel are selected. Any pixel with a density value of 0 is disregarded, and then the procedure advances to step S7.

At step S7, it is judged whether any of thus selected four adjacent pixels is already assigned with a label number L or not. If it is judged as "NO" meaning that none of adjacent pixels have label number, the procedure advanced to step S17 where a label number which is one of a sequence number starting from "one" and is not used yet is assigned to the target pixel. The procedure advances to step S13.

If it is judged as "YES" at step S7 meaning that any of adjacent pixels has the label number L, the procedure advances to step S9 where it is judged whether four adjacent pixels have a common label number or not.

At step S9, if it is judged as "NO" meaning that two or more label numbers L=n, L=m, . . . (n, m, . . . are integers) are already assigned to the four adjacent pixels, the smallest value n, for example, of the label numbers of the adjacent pixels is assigned to the target pixel, and then the procedure advances to step S21.

At step S21, the information indicating the label numbers L=n of the target pixel and L=m, for example, of the adjacent pixels are connected is stored in the pixel connection relationship storage 13 for later use when organizing and unifying the connected label numbers. Then, the procedure advances to step S13.

However, if it is judged "YES" at step S9 meaning that all adjacent pixels has a common label number or only one adjacent pixel has a label number, the procedure advances to step S11.

At step S11, this common or sole label number is assigned to the target pixel. Then, the procedure advances to step S13.

At step S13, it is judged whether the target pixel is located at the right bottom corner of the image matrix, meaning that the target pixel P is the final pixel of the image, for example the pixel P90 as shown in FIG. 7, or not. If the target pixel is not the final pixel, it is judged as "NO" and the procedure advances to step S23.

At step S23, it is judged whether the target pixel P is located on the right end of the scanning line of the image or not. If it is judged as "NO" at step S23, the procedure advances to step S25 where the next pixel adjacent horizontally to the target pixel is scanned. And then, the procedure returns to step S3.

If it is judged as "YES" at step S23, the procedure advances to step S27 where the pixel located on the left end of the next scanning line of the image is scanned. And then, the procedure returns to step S3.

However, if the target pixel is the final pixel of the image, it is judged as "YES" at step S13, and then the procedure advances to step S15. It is to be noted that all density 1 pixels in the image are scanned and assigned label number(s) L at either one of steps S11, S17, and step S19, before it is confirmed at this step that the final pixel was already examined.

At step S15, the plural label numbers assigned to pixels in each of connected regions are unified to a single common label number according to the information stored at step S21 so that the pixel label numbers in one connected label region are unified. Then, the procedure advances to step S16.

At step S16, where the maximum value of label number re-assigned to the target pixels is stored in the a maximum label number storage 15.

After this labelling and renumbering process is completed, the region, or the number of pixels more specifically, of each uniquely numbered linked region (hereafter referred to as "label regions") is computed. While there may be reflections (density 1 pixel regions) other than flaws caused by irregular reflections from dust or other foreign matter or slight irregular reflection from smooth regions, these regions will be limited to a very small region. As a result, label regions smaller than a predetermined region threshold are eliminated to prevent false recognition of flaws, and the label regions exceeding a predetermined region threshold are extracted as what may be "flaws".

Before explaining the clustering operation of the sub block #7 of FIG. 2, the concept of the clustering the labelled regions are described below.

After the labelling process at the block #5 (FIG. 2), labelled regions oriented in the same direction on the same line are assumed to have been caused by a common factor, e.g., a single impact, and are therefore evaluated as a single cluster. For this purpose, the quadratic moment of the labelled regions is used to evaluate whether two labeled regions are to be clustered or not. This quadratic moment is defined and calculated as follows.

Specifically, the quadratic moment in the XY coordinate system of the labelled region is expressed as Vx, Vy, and Cxy which can be calculated using the following equations.

$$Vx = \sum_{(x,y)\in s} (x-\bar{x})^2/S. \tag{1}$$

$$Vy = \sum_{(x,y)\in s} (y-\bar{y})^2/S. \tag{2}$$

$$Cxy = \sum_{(x,y)\in s} (y-\bar{y}) \cdot (x-\bar{x})/S, \tag{3}$$

where $$S = \sum_{(x,y)\in s} 1, \tag{4}$$

$$\bar{x} = \sum_{(x,y)\in s} x/S, \tag{5}$$

and $$\bar{y} = \sum_{(x,y)\in s} y/S. \tag{6}$$

Equations (1), (2), and (3) can be respectively reduced to:

$$Vx = \overline{(x-\bar{x})^2} \tag{7}$$

$$Vy = \overline{(y-\bar{y})^2} \tag{8}$$

$$Cxy = \overline{(y-\bar{y}) \cdot (x-\bar{x})} \tag{9}$$

Figure 8A:
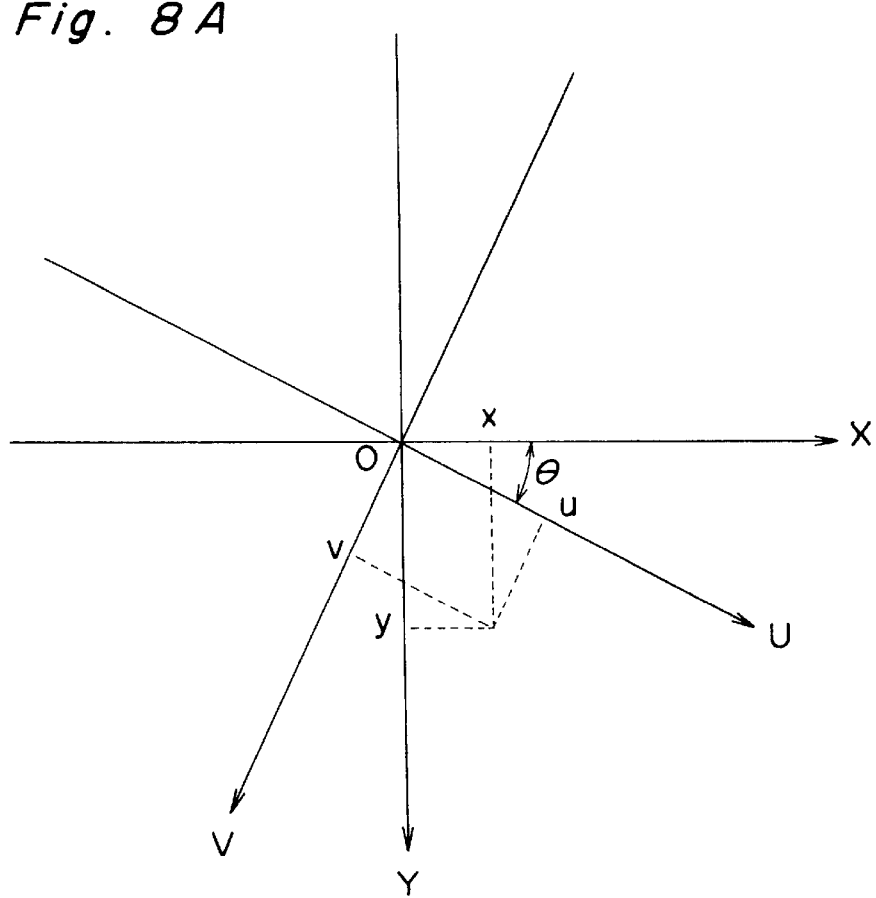
FIG. 8A is a graph showing an axis conversion of the XY axes and UV axes.
Figure 8B:
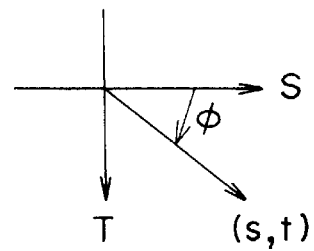
FIG. 8B is a graph showing the coordinates in the axial direction.

Referring to FIG. 8A, the relationship between XY coordinate and UV coordinate is shown. The conversion equations (10) to (13) for converting between XY coordinate space and UV coordinate space are shown below.

The conversion equations from XY coordinate space to UV coordinate space are:

$$x = u \cdot \cos\theta - v \cdot \sin\theta \tag{10}$$

$$y = u \cdot \sin\theta + v \cdot \cos\theta \tag{11}$$

and the conversion equations from UV coordinate space to XY coordinate space are:

$$u = x \cdot \cos\theta + y \cdot \sin\theta \tag{12},$$

and $$u = -x \cdot \sin\theta - y \cdot \cos\theta \tag{13}$$

The quadratic moment in the UV coordinate system of the labelled region is expressed as Vu, Vv, and Cu, which can be calculated using the following equations.

$$Vu = \overline{(u-\bar{u})^2} \tag{14},$$

$$Vv = \overline{(v-\bar{v})^2} \tag{15},$$

and $$Cuv = \overline{(u-\bar{u}) \cdot (v-\bar{v})} \tag{16}.$$

Substituting equations (12) and (13) into equations (14), (15), and (16) yields:

$$Vu = Vx \cdot \cos^2\theta + Vy \cdot \sin^2\theta + 2 \cdot Cxy \cdot \cos\theta\sin\theta \tag{17},$$

$$Vv = Vx \cdot \sin^2\theta + Vy \cdot \cos^2\theta - 2 \cdot Cxy \cdot \cos\theta\sin\theta \tag{18},$$

$$Cuv = (Vy - Vx) \cdot \cos\theta\sin\theta + Cxy(\cos^2\theta - \sin^2\theta) \tag{19},$$

and $$Cuv = (Vy - Vx) \cdot \sin 2\theta/2 + Cxy \cdot \cos 2\theta \tag{20}.$$

Thus, if $$\theta = \arg(Vx - Vy, 2Cxy)/2 \tag{21},$$

where function arg(x, y) expresses the angle of vector (x, y). Then, the equation (20) becomes Cuv=0, because $\tan 2\theta = 2 \cdot Cxy/(Vx-Vy)$. Even if Vx=Vy, $\cos 2\theta = 0$. Therefore, the equation (20) remains valid such that Cuv=0.

From equations (17) and (18), the following equation is obtained.

$$\begin{aligned} Vu - Vv &= (Vx - Vy)(\cos^2\theta - \sin^2\theta) + 4 \cdot Cxy \cdot \cos\theta\sin\theta \\ &= (Vx - Vy) \cdot \cos 2\theta + 2 \cdot Cxy \cdot \sin 2\theta \end{aligned} \tag{22}$$

Because $2\theta$ is the angle of vector (Vx−2·Cxy), the following two equations of $$Vx - Vy = \sqrt{(Vx - Vy)^2 + 4 \cdot Cxy^2} \cdot \cos 2\theta \tag{23}$$

and $$2 \cdot Cxy = \sqrt{(Vx - Vy)^2 + 4 \cdot Cxy^2} \cdot \sin 2\theta \tag{24}$$

are obtained. Substituting these into equation (22) yields an equation of $$Vu - Vv = \sqrt{(Vx - Vy)^2 + 4 \cdot Cxy^2}. \tag{25}$$

Thus, from equations (17) and (18) and because of that $Vu \geq Vv$, an equation of $$\begin{aligned} \partial Vu/\partial(2\theta) &= -\partial Vv/\partial(2\theta) \\ &= 2 \cdot \{(Vy - Vx) \cdot \cos\theta\sin\theta + Cxy(\cos^2\theta - \sin^2\theta)\} \end{aligned} \tag{26}$$

is obtained. As a result, if the coordinates are converted so that the covariance is 0, the quadratic moments Vu and Vv of each coordinate U and V will be the maximum and minimum values, respectively.

These quadratic moments Vu and Vv are refereed to as the major axis quadratic moment and the minor axis quadratic moment, respectively.

The value θ in equation (21) is also the major axis angle of the labelled region. The function arg (Vx−Vy, 2Cxy) in equation (21) is also the angle of vector (s, t) shown in FIG. 8B. Therefore, arg (Vx−Vy, 2Cxy) can be expressed by the following equation of $$
\begin{aligned}
arg(s, t) &= \arctan(t/s) & (s \neq 0, t > 0) \\
&= \arctan(t/s) + \pi & (s \neq 0, t < 0) \\
&= 0 & (s \geq 0, t = 0) \\
&= \pi & (s < 0, t = 0) \\
&= \pi/2 & (s = 0, t > 0) \\
&= \pi \cdot 3/2 & (s = 0, t < 0)
\end{aligned}
\quad (27)
$$

is obtained, where $0 \leq \arctan(\ ) < \pi$.

When φ is equal to the arg (s, t), the following two equations are established.

$$s = \sqrt{s^2 + t^2} \cdot \cos\phi. \quad (28)$$

$$t = \sqrt{s^2 + t^2} \cdot \sin\phi. \quad (29)$$

The quadratic moment is obtained for each labelled region, and those regions with the same major axis angle θ are combined. This combining operation is called "clustering", and is accomplished as follows.

The first step is determining whether the "labelled region clustering condition" described below is satisfied. This evaluation is applied to all combinations of labeled image data areas, and the results are stored.

After completing this operation for all labelled regions, the label numbers of the labelled regions meeting the clustering condition are unified, and all pixels in each labelled region clustered are adjusted to the same label member. The method for determining the clustering condition is specifically described later.

Figure 4:
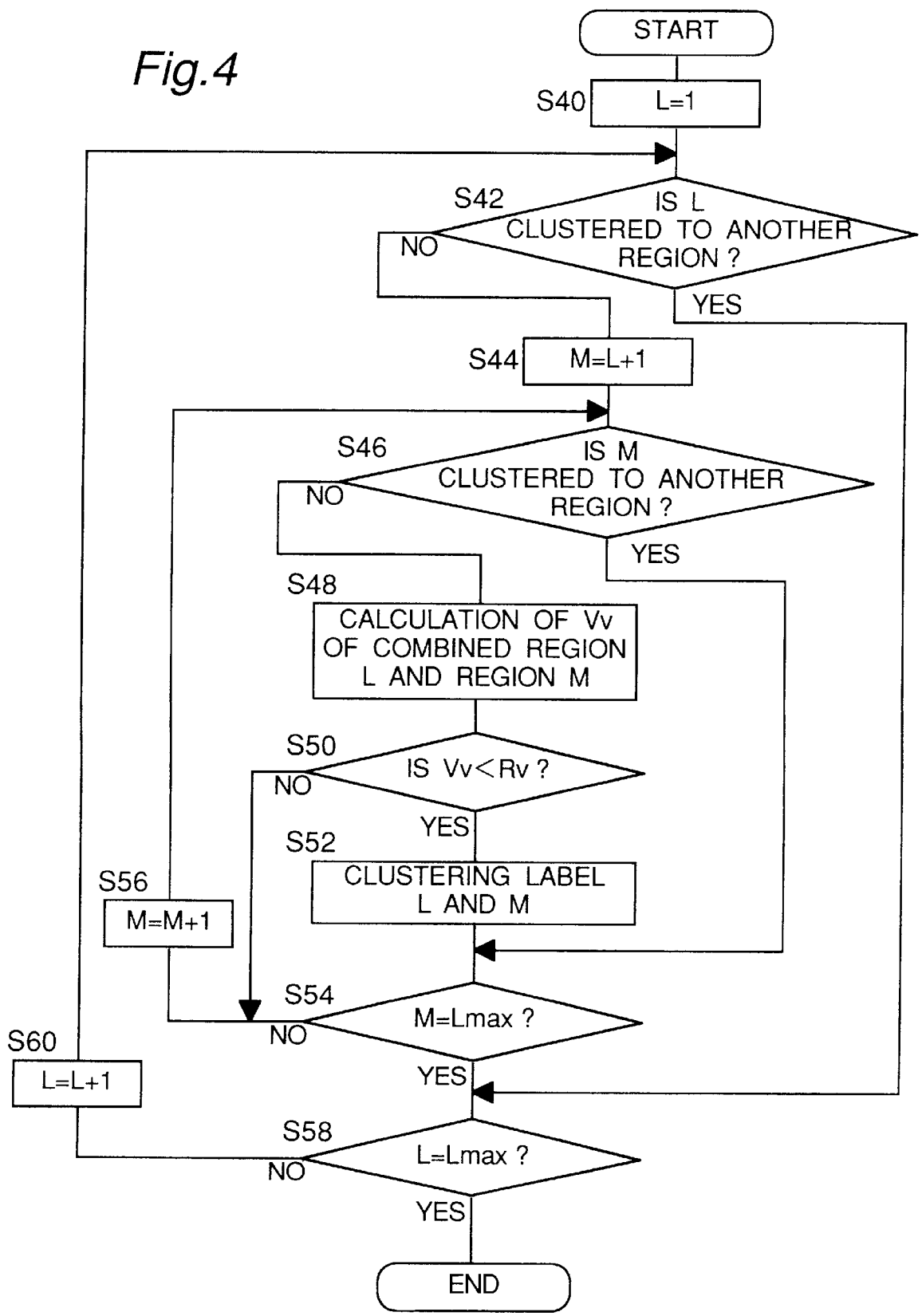
FIG. 4 is a flow chart showing an operation of the clustering block in FIG. 2.

Referring to FIG. 4, the operation of sub routine block #7, "CLUSTERING", in FIG. 2 is shown. After the labelling process at the block #5, labelled regions oriented in substantially the same direction on substantially the same line are assumed to have been caused by a common factor, e.g., a single impact, an are therefore evaluated as a single cluster. For this purpose, the quadratic moment of the labelled region is used to evaluate whether the labelled regions are to be clustered to one regions or not. This quadratic moment is defined and calculated as follows.

Specifically, the quadratic moment in the XY coordinate system of the labelled regions is expressed as Vx, Vy, and Cxy which are calculated using the above described equations (1) to (29).

At step S40, one is set to the label number L. Thus, the area having the label number (L=1) is set as the target region, and then the procedure advances to step S42.

At step S42, it is judged whether the target region (L=1) is already assigned to other region or not. When this region is not joined (clustered) with other region, it is judged as "NO", and the procedure advances to next step S44. However, when the target region (L=1) is already joined with other, it is judged as "YES". Then the procedure advances to step S58 where the existence of other target region is checked.

At step S44, the current label number L is incremented by 1 as "L+1" and this incremented value is set to the label number M for a next region, and then advances to step S46. Thus, a region having the label number (M=L+1) is selected as a counterpart of the target region L to study the possibility of clustering thereof.

At step S46, it is judged whether the counterpart region M is already joined (clustered) to other region or not, When "NO, the procedure advances to next step S48 for studying the clustering. When the counter part region M is already joined to other region, it is judged as "YES". Then the procedure advances to step S54 where the existence of other counter part region is checked.

At step S48, a minor axis quadratic moment Vv of the combined regions L and M is calculated, as expressed by the equation (15), and then the procedure advances to next step S50.

At step S50, it is judged whether the minor axis quadratic moment Vv of the combined regions L and M calculated at step S48 is less than a reference quadratic moment Rv having a predetermined value or not. It is to be noted that the reference quadratic moment Rv can be determined according to the quality required for each object (product), because the allowable limit of flaw is different according to the usage of the product. Therefore, the reference quadratic moment Rv is set previously or supplied from the externals of the apparatus. It is possible to provide a device which can determine the reference quadratic moment Rv according to the flaw sample in a manner which will be described later.

When the quadratic moment Vv of the combined regions L and M is greater than the reference moment Rv, meaning that these regions L and M can be combined as a single of cluster. Then it is judged "YES" at step S50, and the procedure advances to step S52. However, it is judged "NO", the procedure advances to step S56.

At step S52, the information meaning that regions L and M can be combined to a single cluster such that the label number of region M shall be renumbered to L is stored in the label clustering relationship storage 17. Then the procedure advances to the next step S54.

At step S54, it is judged whether the label number L is the greatest among the label numbers already assigned or not. When it is "YES" meaning that there is no counterpart region available, the procedure advances to step S58 where the existence of other target region is checked. When it is judged "NO" meaning that there is at least one counterpart region rested in the image, and the procedure advances to step S56.

At step S56, the label number M is incremented by one, and then the procedure returns to step S46. Thus, the region having the label number of M=M+1 is set as the next counterpart region M which will be studied the possibility of clustering to the target region L.

At step S58, it is judged whether the label number L is the greatest among the label numbers already assigned or not. When it is "NO" meaning that there is at least one target region remains in the image, the procedure advances to step S60.

At step S60, the label umber L is incremented by one, and then the procedure returns to step S42. Thus, the region having the label number of L=L+1 is set as the next target region L which will be studied the possibility of clustering to the counterpart region M. However, when it is "YES" at step S58, meaning that there is no target region remains in the image, the procedure terminates.

Figure 9A:
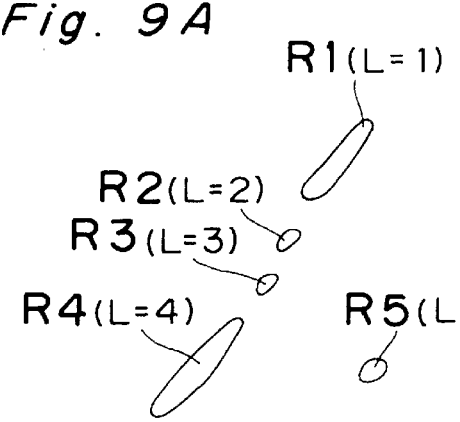
FIGS. 9A, 9B, 9C, 9D, 9E, and 9F are illustrations of assistance in explaining the renumbering process according to the present invention.
Figure 9B:
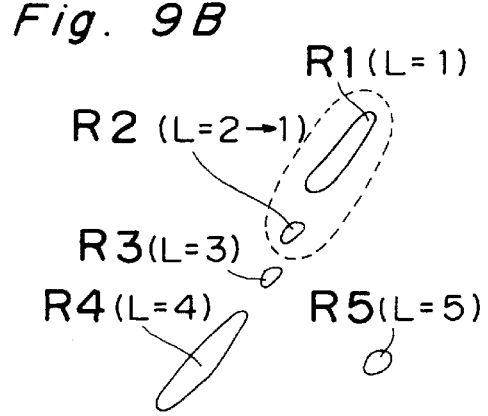

Herebelow, the clustering operation is schematically explained with reference to FIGS. 9A, 9B, 9C, 9D, 9E, and 9F. As a result of the labeling operation, each of linked regions R1, R2, R3, R4, and R5 in the binary image of the inspected surface of FIG. 6B are assigned the label numbers of 1, 2, 3, 4, and 5, respectively, as shown in FIG. 9A.

At first, the first region R1 and the second region R2 are set as the target region (L=1) and the counterpart region (M=L=2), respectively. Since the minor quadratic moment Vv of the combined regions R1 and R2 is smaller that the reference moment Rv, because these regions R1 and R2 are located on substantially the same line. Therefore, regions R1 and R2 can be clustered (step S50), as enclosed by a dot line in FIG. 9B, and the information representing that the label number of regions R2 is renumbered to 1 from 2 is stored (step S52).

Figure 9C:
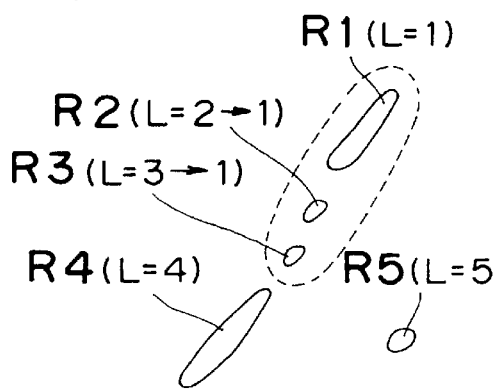

Next the third region R3 is set as the counterpart region (M=3) of the target region (L=1) which is combined regions R1 and R2, as enclosed by a dot line in FIG. 9C. Similarly, since the third region R3 can be clustered to the combined target regions R1 and R2, the information that the label number of the region R3 is renumbered to 1 from 3 is stored.

Figure 9D:
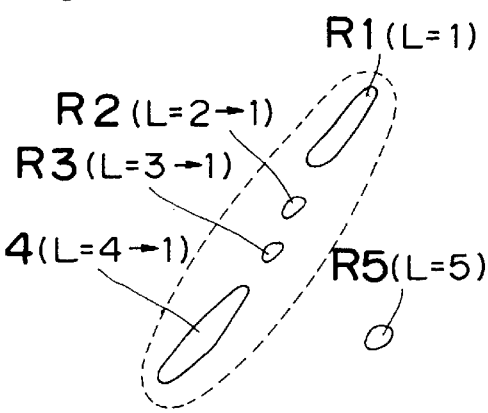

Similarly, the fourth region R4 can be clustered to the combined target regions R1, R2, and R3, with the label number thereof is renumbered to 1, as shown in FIG. 9D.

Figure 9E:
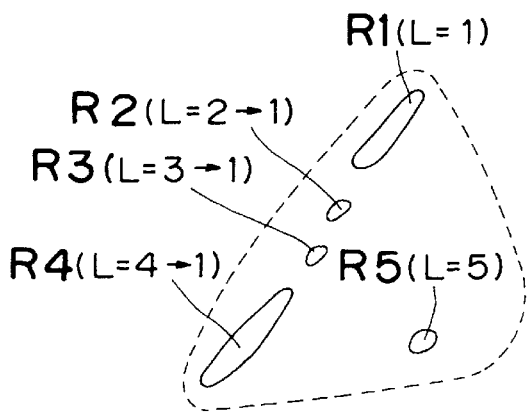
Figure 9F:
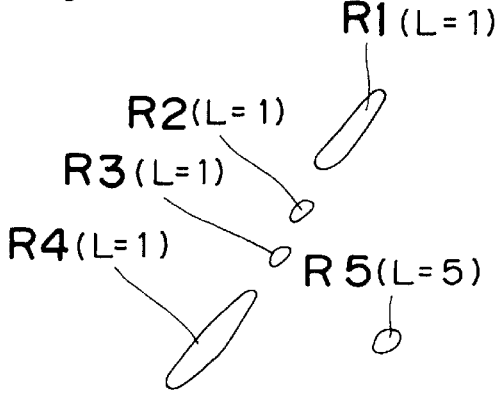
Figure 10:
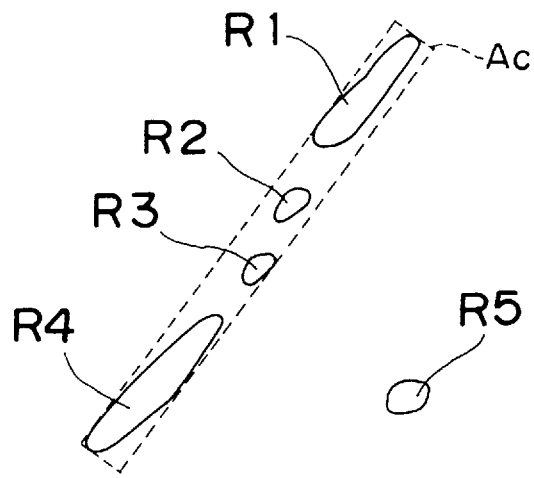
FIG. 10 is an illustration of assistance in explaining the obtaining the operation to determine flaw coefficients.

Next the fifth region R5 is set as the counterpart region (M=5) of the combined target regions R1, R2, R3, and R4 (L=1). The fifth region R5 is not on the same line and is deviated from the combined target regions R1, R2, R3, and R4, as shown in FIG. 9E. Therefore, this counterpart region R5 can not be clustered, as shown in FIG. 9F. In other words, the regions R1, R2, R3, and R4 can be combined or clustered in a single region having the same label number L which is one.

Next, the condition for clustering the labelled regions is described. The labeled regions are clustered to a signal region when the minor axis quadratic moment of two regions is less than or equal to a predetermined threshold. When there are three labelled regions No. 1, No. 2, and No. 3, the clustering is determined as follows. The value of the minor axis quadratic moment is obtained from equations (17) and (18), and the orientation from equation (21). The minor axis quadratic moment of unified labelled regions is obtained as follows. The quadratic moment of region No. 3, obtained by combining regions No. 1 and No. 2, is calculated using the following equations, which is derived from equations (1) to (4)

$$Vx_i = \overline{(x_i)^2} + (\overline{x_i})^2 \quad (i=1, 2) \tag{30},$$

where "i" represents the region No.

$$\overline{x_3} = (S_1 \cdot \overline{x_1} + S_2 \cdot \overline{x_2})/S_3 \tag{31}.$$

$$(\overline{x_3})^2 = \{S_1 \cdot \overline{(x_1)^2} + S_2 \cdot \overline{(x_2)^2}\}/S_3 \tag{32}.$$

$$Vx_3 = \overline{(x_3)^2} - (\overline{x_3})^2 \tag{33}.$$

$Vx_3$ is obtained by substituting equations (30) and (32) into equation (31).
In addition, because $$Vy_i = \overline{(y_i)^2} + (\overline{y_i})^2 \quad (i=1, 2) \tag{34},$$

$$\overline{y_3} = (S_1 \cdot \overline{y_1} + S_2 \cdot \overline{y_2})/S_3 \tag{35},$$

$$(\overline{y_3})^2 = (S_1 \cdot \overline{(y_1)^2} + S_2 \cdot \overline{(y_2)^2})/S_3 \tag{36},$$

and $$Vy_3 = \overline{(y_3)^2} - (\overline{y_3})^2 \tag{37},$$

$Vy_3$ is obtained by substituting equations (34), (35), and (36) into equation (37). Then, the following equations are also obtained.

$$Cx_i y_i = \overline{x_i y_i} - \overline{x_i} \cdot \overline{y_i} \tag{38}.$$

$$\overline{x_3 y_3} = (S_1 \cdot \overline{x_1 y_1} + S_2 \cdot \overline{x_2 y_2})/S_3 \tag{39}.$$

$$Cx_3 y_3 = \overline{x_3 y_3} - \overline{x_3} \cdot \overline{y_3} \tag{40}.$$

$S_i$, $Vx_i$, $Vy_i$, $Cx_i y_i$ in equations (38), (39), and (40) represent the region, variance x, variance y, and variance xy of region i, respectively.

$Cx_3 y_3$ is also obtained by substituting equations (32), (35), (38), and (39) into equation (40), and the minor axis quadratic moment $Vx_3$, $Vy_3$, $Cx_3 y_3$ is thus obtained after clustering. The smaller the minor axis quadratic moment, the thinner and longer the shape of the region. Flaws caused by impact also tend to be a series of thin, long marks, and the minor axis quadratic moment of such flaws is therefore smaller. As a result, by combining two regions which still have a small minor axis quadratic moment after being combined, it is possible to evaluate clusters of flaws that are caused by a single impact but are separated into a series of small marks.

Even, more accurate flaw detection is enabled by using a combination of region and minor axis quadratic moment characteristics in the evaluation of clustered regions. An example of the evaluation standard used in this case is described below.

Region×$k_1$–minor axis quadratic moment×$k_2 \geq t_1$(41), where coefficients $k_1$, $k_2$, and $t_1$ indicate the distribution of the shape of flaws determined from actual inspection and defined according to the desired inspection standard. If this equation (41) is true, the image is determined to represent a flaw.

A flaw detection method according to the second embodiment of the invention is described below with reference to FIG. 11. To evaluate which density images represent a flaw after obtaining the density images in this embodiment, density areas within the complete density image that are oriented in substantially the same direction on substantially the same line are assumed to have been caused by a common factor, e.g., a single impact, and are therefore evaluated as a single cluster.

Usually, the flaw is shaped in a curved form which is bent by 30 degree at maximum, but not in a straight form. To increase the resolving ability of the image shape, the pixels located on the position distant from the target pixel P should be selected as adjacent pixels Pa. The resolving ability when the pixels next to the target pixel P is selected as the adjacent pixels Pa, the resolving ability is 45 degree.

Figure 11:
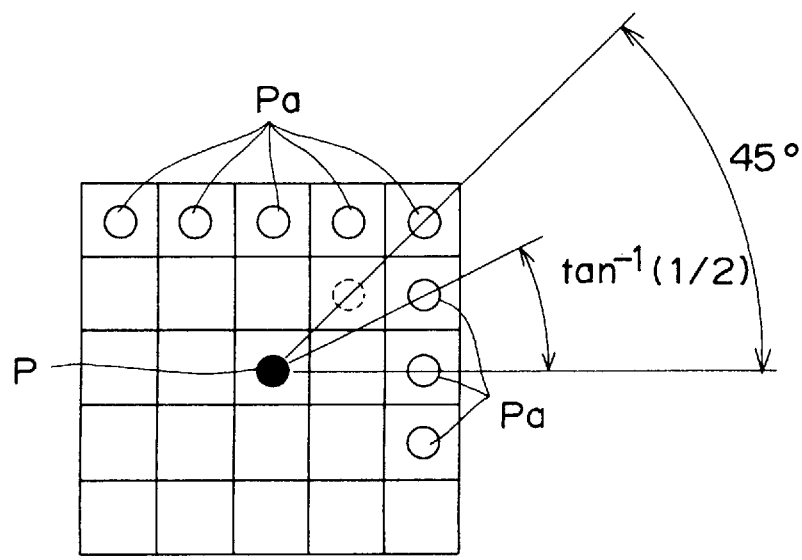
FIG. 11 is an illustration of assistance in explaining the relationship between the image shape resolving degree and the position of adjacent pixel.

When the pixels separated two pixels are selected as the adjacent pixels Pa, the resolving ability is less than $\tan^{-1}$ (½) degree which is approximately 26.6 degree, as shown in FIG. 11. The resolving ability when the Nth pixel separated from the target pixel P is set as the adjacent pixels Pa is less than $\tan^{-1}$ (1/N) degree.

To determine in which direction the long axis of the density image is oriented in this embodiment, the directional difference value (DDV) is obtained as the absolute value of the difference between the pixel density of the target pixel P and the pixel density of the eight subtraction pixels Pa separated two pixels (N=2) from the target pixel P. It is not be noted that the resolving ability of 26.6 degree is good enough for recognizing the flaw image which is bent by about 30 degree. If the greater resolving ability is necessary, the adjacent pixels Pa Nth pixels from the target pixel P can be used, as described above.

$$DDV = |P(x,y) - P(x+i, y+j)| \tag{42}$$

where (x,y) is the target pixel, (x+i, y+j) are the subtraction pixels, and the (i,y) combination varies with the direction.

In the case of a density image, the change in density is small in the direction of the long axis. As a result, if the directional difference values are obtained as described above, the directional difference value in the long axis of the density image will naturally be smaller. The directional difference value obtained from equation (42) is therefore used in place of the quadratic moment of the binary images used in the first embodiment above.

This directional difference value is used as follows.

The directional difference value is obtained in the eight directions described above for every pixel in the density image. The average directional difference value is then obtained in each of the eight directions, the maximum and minimum average directional difference values are obtained from the eight average directional difference values (DDV), and the long axis of the density image is determined based on the directional difference ratio (DDR) obtained from equation (43).

$$DDR = \text{min. avg. } DDV / \text{max. avg. } DDV \qquad (43)$$

The smaller this directional difference ratio, the longer and thinner the density image.

Density images for which this directional difference ratio is less than a predetermined threshold value may represent a flaw. The joint directional difference ratio is therefore obtained for joined density images, which are formed by combining two density images with a directional difference ratio less than the predetermined threshold value, and whether the joined density image represents a flaw is evaluated based on a combination of the area of the joined density image and a feature value, which expresses the shape and orientation of the joined density image as calculated from the area and joint directional difference ratio.

An example of this evaluation standard is obtained by an equation, as shown below, of $$\text{area} \times k_3 - DDR \times k_4 \geq t_2 \qquad (44),$$

where coefficients $k_3$, $k_4$, and $t_2$ indicate the distribution of the shape of flaws determined from actual inspection and defined according to the desired inspection standard. Specifically the equation (44) is TRUE, the image is determined to represent a flaw in this example.

Figure 5:
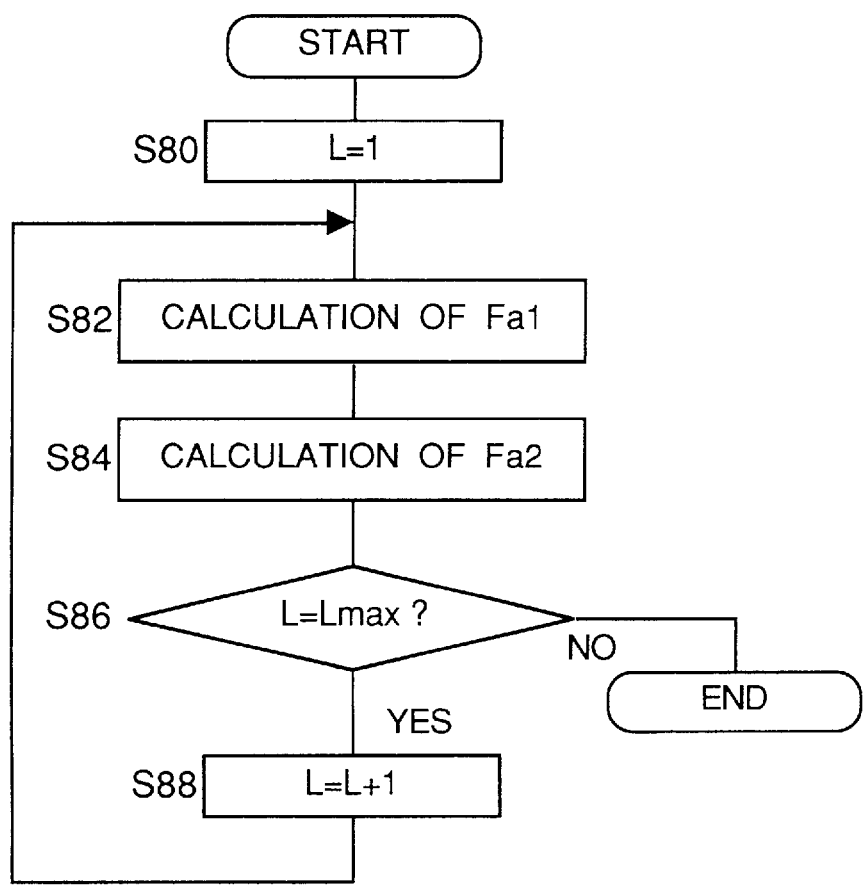
FIG. 5 is a flow chart showing an operation of the flaw coefficients calculation block in FIG. 2.

Referring to FIG. 5, the operation of sub block #9 "FLAW COEFFICIENTS CALCULATION" in FIG. 2 is shown.

At step S80, the label number L is set to one. The first clustered regions are examined.

At next step S82, an area of the first clustered regions with the common label number (L=1) is calculated to obtain a first flaw coefficient Fa1.

At next step S84, a rectangle circumscribing area of the first clustered regions (L=1) is calculated to obtain a second flaw coefficient Fa2. Thus, the first and second flaw coefficients Fa1 and Fa2 are obtained with respect to the first clustered regions.

At next step S86, it is judged whether the label number L is the greatest among the clustered regions or not. If "NO", the procedure advances to next step S88.

At step S88, the label number L is incremented by one and the procedure returns to step S82. This time, the flaw coefficients Fa1 and Fa2 are subsequently obtained with respect to the next, or second, clustered regions until it is judged "YES" at step S86.

However, when the flaw coefficients Fa1 and Fa2 are obtained with respect to all clustered regions at this sub routine #9, it is judged as "YES" at step S86, the procedure ends.

Then, the image processor 9 outputs the flaw coefficient signal Sf including thus obtained first and second flaw coefficients Fa1 and Fa2 to the outside through the output port 19. These flaw coefficients Fa1 and Fa2 are compared with the reference flaw coefficients having predetermined value for judging whether thus obtained image is indicative of a flaw on the object or not. It is to be noted that the reference flaw coefficients can be determined according to the quality required for each object (product), because the allowable limit of flaw is different according to the usage of the product. Therefore, the reference flow coefficients are set inside the flaw detection apparatus previously or supplied from the externals of the apparatus.

It is possible to determine the reference flaw coefficients with respect to the flaw sample by using the flaw detection apparatus according to the present invention in a manner which will be described later with reference to FIGS. 12, 13, and 14.

Figure 12:
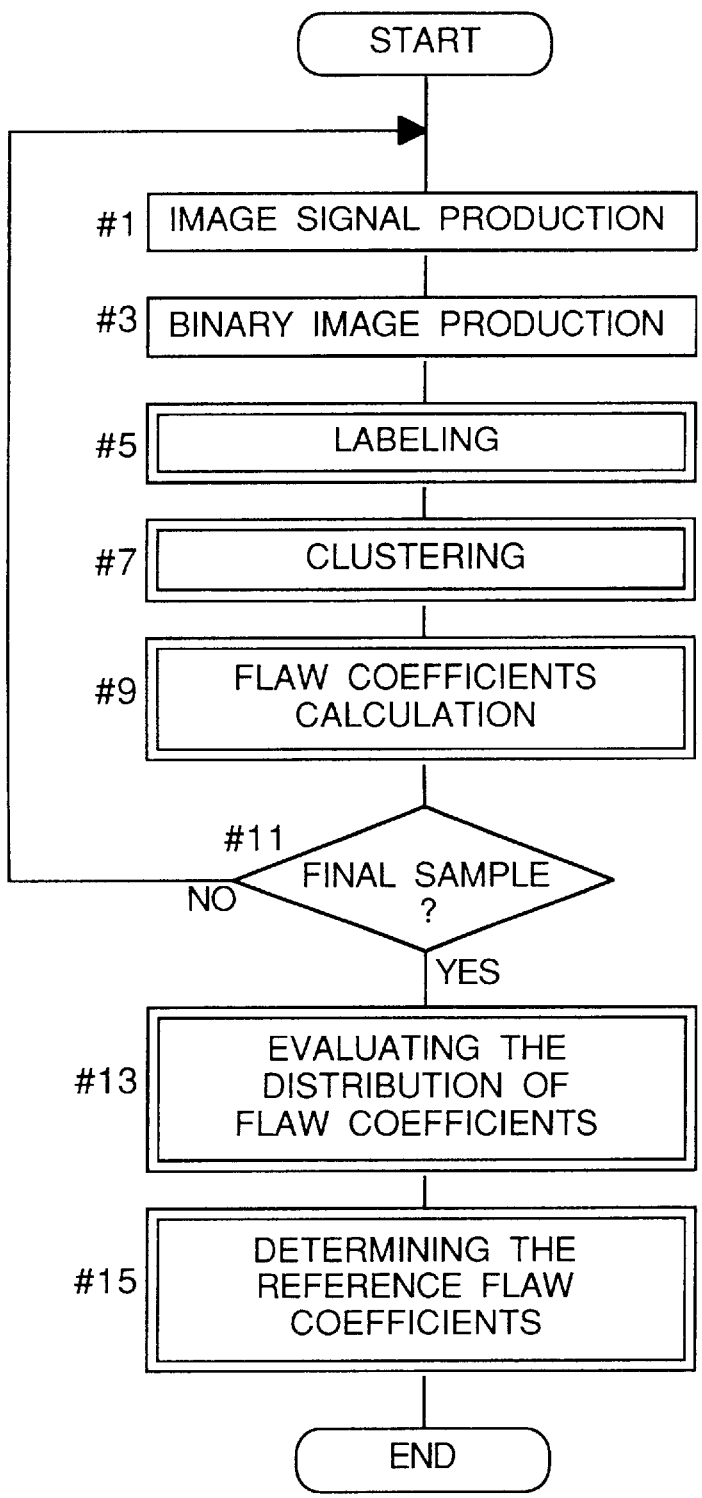
FIG. 12 is a flow chart showing the operation of judging flaw according to the present invention.
Figure 13:
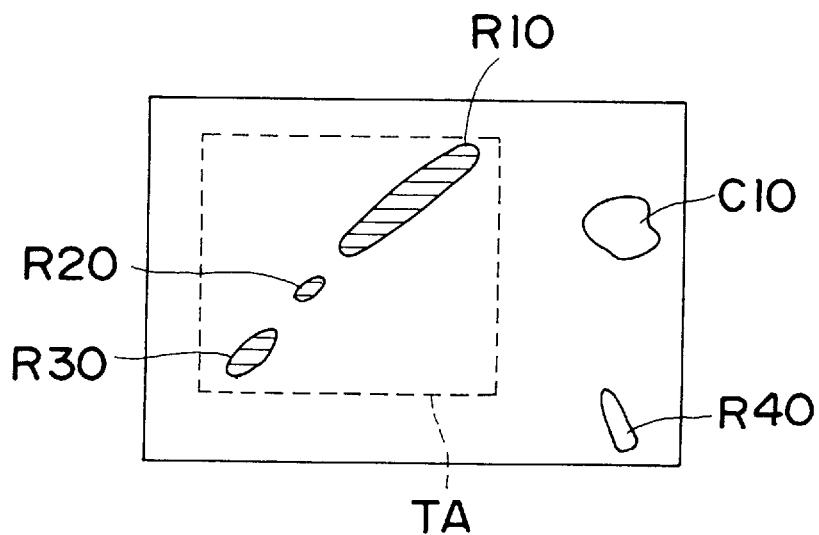
FIG. 13 is an illustration of assistance in explaining the operation of determining flaw coefficients block in FIG. 12.

Referring to FIG. 12, the flow chart describing the flaw judging operation according to the present invention is shown. The operations of the blocks #1, #3, #5, #7, and #9 are identical to the blocks having the same block numbers shown in FIG. 2, and the description of those operation are omitted for the sake of brevity.

First, product samples bearing the flaws whose sizes are within an allowable range for use in the market and samples over an allowable range are prepared. In FIG. 13, for example, a sample bearing four flaws R10, R20, R30, and R40 and contaminant C10 is shown. Flaws R10, R20, and R30 are aligned on substantially a line, and the flaw R40 separates from the other flaws. The contaminant C10 is located on the surface thereof. In this case, the flaws R10, R20, and R30 enclosed by a rectangular area TA indicated by a dot line are regarded as the "target flaws" which may be caused by a single impact, but the flaw R40 may be caused by other factor. Therefore, the flaws R10, R20, and R30 is regarded as the "target flaw" to be detected, but the flaw R40 is disregarded.

In the operation of sub block #1, the video camera 3 is set to take the image of the rectangular area TA (Step #1). Each of thus prepared samples is examined its surface by the flaw detection apparatus according to the present invention through the operation of steps #1, #3, #5, #7, #9, and #11 of FIG. 12. As a result, the flaw coefficients Fa1 and Fa2 for each samples with respect the target area TA wherein no contaminant or flaw which may be caused by a factor other than a signal impact is included.

Figure 14:
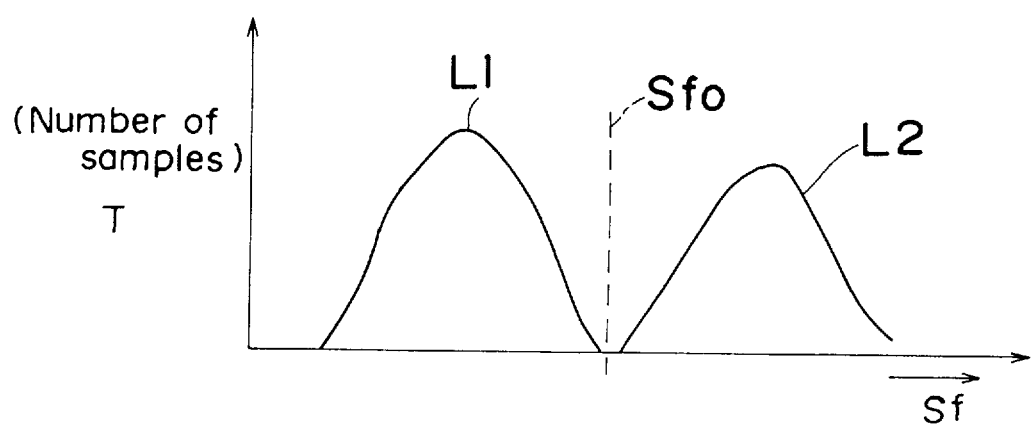
FIG. 14 is a graph showing the distribution of samples with respect to the flaw coefficients.

In sub block #13, "EVALUATING THE DISTRIBUTION OF FLAW COEFFICIENTS", the distribution of thus obtained flaw coefficients is obtained, as shown in FIG. 14. In FIG. 14, a line L1 shows a set (distribution) of flaw coefficients with respect to the samples bearing the flaws within the allowable flaw size range, and a line L2 shows those with respect to the samples bearing the flaws over the allowable flaw size range. It is to be noted that each of sets of the flaw coefficients within the allowable range and over the allowable range can be separated by a predetermined value of flaw coefficient Sfo in two group, as shown in FIG. 14.

In next sub block #15, "DETERMINING THE REFERENCE FLAW COEFFICIENTS", the value Sfo obtained in sub block #13 is determined as a reference flaw coefficient for the flaw judgment.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A flaw detection apparatus for detecting a flaw formed on a surface of an object based on a plurality of first digital image data representing said surface as a plurality of first groups of plural pixels, each pixel of each first group being adjacent to each other, said apparatus comprising:

first direction detection means for detecting a direction in which each first group extends based on the axis quadratic moment of each of said first groups by:
   a) first calculating the axis quadratic moment of each of said first groups, then
   b) assigning a value for the major axis angle of each of said first groups;

first cluster means for combining said first groups that are disconnected and extend in directions different from each other less than a first predetermined degree based on the respective detected axis quadratic moment of each of said first groups and based on said major axis angle of each of said first groups; and first flaw signal producing means for producing a first flaw signal indicating sizes of said combined groups based on an area of said combined first groups and a rectangular circumscribing area of said combined first groups.

2. A flaw detection apparatus as claimed in claim 1, wherein said first flaw signal producing means comprises:

first flaw coefficient determining means for calculating the area of said combined first groups to determine a first flaw coefficient; and second flaw coefficient determining means for calculating the rectangular circumscribing area of said combined first groups to determine a second flaw coefficient.

3. A flaw detection apparatus as claimed in claim 2, further comprising reference flaw signal means for providing a reference flaw signal indicative of a flaw range of said first and second flaw coefficients for the detection of the flaw.

4. A flaw detection apparatus as claimed in claim 3, wherein said reference flaw signal means comprises:

digital image signal producing means for producing a second digital image signal indicative of a second flaw on the surface of the object represented as a plurality of second groups of plural pixels;

second direction detection means for detecting a direction in which each second group extends;

second cluster means for combining said second groups extending in directions different from each other less than a second predetermined degree;

third flaw coefficient determining means for calculating an area of said combined second groups to determine a third flaw coefficient;

fourth flaw coefficient determining means for calculating an area of rectangular region circumscribing said combined second groups to determine a fourth flaw coefficient; and evaluation means for evaluating the distribution of said third and fourth flaw coefficients to determine a second flaw range.

5. A flaw detection apparatus for detecting a flaw formed on a surface of an object based on a digital image data indicative of said surface as a plurality of groups of plural pixels adjacent to each other, said apparatus comprising:

minor axis quadratic moment determining means for obtaining a minor axis quadratic moment of a combination of two of said groups that are disconnected by calculating one minor axis quadratic moment of a combined two groups;

comparator means for comparing said determined minor axis quadratic moment with a predetermined minor axis quadratic moment; and cluster means for combining said two groups when said determined minor axis quadratic moment is less than said predetermined minor axis quadratic moment.

* * * * *